US009976530B2

(12) United States Patent
Shaw

(10) Patent No.: US 9,976,530 B2
(45) Date of Patent: May 22, 2018

(54) METHOD OF REPAIRING A CRACKED HEAD USING AN INJECTOR BORE INSERT

(71) Applicant: Cummins Inc., Columbus, IN (US)

(72) Inventor: Terrence M. Shaw, Columbus, IN (US)

(73) Assignee: Cummins Inc., Columbus, IN (US)

( * ) Notice: Subject to any disclaimer, the term of this patent is extended or adjusted under 35 U.S.C. 154(b) by 201 days.

(21) Appl. No.: 15/155,664

(22) Filed: May 16, 2016

(65) Prior Publication Data
US 2016/0258406 A1 Sep. 8, 2016

Related U.S. Application Data

(63) Continuation of application No. 13/946,953, filed on Jul. 19, 2013, now Pat. No. 9,370,845.

(51) Int. Cl.
F02M 61/14 (2006.01)
B23P 6/04 (2006.01)
B23P 6/00 (2006.01)
F02F 1/24 (2006.01)
F02F 11/00 (2006.01)
F02P 13/00 (2006.01)

(52) U.S. Cl.
CPC .............. F02M 61/14 (2013.01); B23P 6/00 (2013.01); B23P 6/04 (2013.01); F02F 1/24 (2013.01); F02F 1/242 (2013.01); F02F 11/002 (2013.01); F02P 13/00 (2013.01); F02F 2001/248 (2013.01); F02F 2200/00 (2013.01); Y10T 29/49233 (2015.01)

(58) Field of Classification Search
CPC ..... B23P 6/02; B23P 6/04; F02F 1/242; F02F 2001/248; F02M 61/14; Y10T 29/49233; Y10T 29/49723; Y10T 29/49726; Y10T 29/49732; Y10T 29/49734; Y10T 29/49741; Y10T 29/49744
USPC ...... 123/266, 275, 470; 29/888.011, 888.061
See application file for complete search history.

(56) References Cited

U.S. PATENT DOCUMENTS 3,066,400 A * 12/1962 Forsythe .................. B23P 6/04
29/402.09
3,694,838 A * 10/1972 Runton .................... B23G 5/06
29/402.17

(Continued)

FOREIGN PATENT DOCUMENTS

CN 100509263 C 7/2009
CN 102056706 A 5/2011

OTHER PUBLICATIONS

Chinese Office Action Issued for Chinese Patent Application No. 201410203684.5, dated Nov. 15, 2016, 5 pages.

(Continued)

Primary Examiner — Erick Solis
(74) Attorney, Agent, or Firm — Foley & Lardner LLP

(57) ABSTRACT

An injector bore insert includes a proximate portion adjacent to a combustion face and a distal portion including an upper threaded outer diameter. The injector bore insert further includes an angled conical collar, a remote threaded portion along an upper bore portion, a circumferential slot extending distally from approximately the combustion face, and one or more sealing regions. Each sealing region is positioned on the injector bore insert to facilitate sealing between the injector bore insert and a cylinder head of an internal combustion engine.

20 Claims, 6 Drawing Sheets

(56) References Cited

U.S. PATENT DOCUMENTS

| | | | |
|---|---|---|---|
| 4,112,906 A | | 9/1978 | Spencer |
| 4,229,867 A | | 10/1980 | Spencer |
| 4,433,660 A | * | 2/1984 | Blaser .................... F02B 19/12 |
| | | | 123/255 |
| 4,918,805 A | | 4/1990 | Liszka et al. |
| 4,967,458 A | | 11/1990 | Rosenberg et al. |
| 5,379,505 A | * | 1/1995 | Reed ........................ B23G 5/06 |
| | | | 29/402.11 |
| 6,212,750 B1 | | 4/2001 | Reed |
| 6,261,039 B1 | * | 7/2001 | Reed ........................ B23P 6/04 |
| | | | 411/178 |
| 6,439,817 B1 | * | 8/2002 | Reed .................... F16B 37/125 |
| | | | 411/110 |
| 6,474,285 B2 | | 11/2002 | Phillips |
| 6,668,784 B1 | * | 12/2003 | Sellers .................... B23B 47/28 |
| | | | 123/169 PA |
| 7,021,275 B2 | * | 4/2006 | Durling .................... F02B 1/12 |
| | | | 123/169 E |
| 7,047,612 B2 | | 5/2006 | Bridges et al. |
| 7,484,281 B2 | * | 2/2009 | Klann .................... B25B 13/48 |
| | | | 29/282 |
| 2008/0237304 A1 | | 10/2008 | Bridges et al. |
| 2017/0159603 A1 | * | 6/2017 | Di Pietro ............... F02M 61/14 |
| 2017/0363054 A1 | * | 12/2017 | Pickard .................. F02M 61/14 |

OTHER PUBLICATIONS

U.S. Office Action issued in U.S. Appl. No. 13/946,953, dated Aug. 26, 2015.
U.S. Notice of Allowance issued in U.S. Appl. No. 13/946,953 dated Feb. 12, 2016.

* cited by examiner

METHOD OF REPAIRING A CRACKED HEAD USING AN INJECTOR BORE INSERT

CROSS REFERENCE TO RELATED APPLICATIONS

The present application is a continuation of U.S. patent application Ser. No. 13/946,953, filed Jul. 19, 2013, the contents of which are incorporated herein by reference in their entirety.

FIELD OF THE INVENTION

The present invention relates to the sealing of a coolant passage from a fuel injector as well as to repair, manufacture and design of fuel injector bores, spark plug bores and pre-chamber bores.

BACKGROUND

An internal combustion engine having a multi-valve cylinder head with an injector or spark plug opening near the valve openings may experience damage by cracking when placed under high pressure or high thermal loads. Damage may include cracking between the injector/plug tip and the valve seats proximate thereto. Once the damage occurs, repair options to the cylinder head are limited, where if repair is possible, the efforts are often costly and time consuming.

FIG. 1 sets forth a cylinder head 100 showing a cross section of an injector bore 120 above the valve seats in a cylinder head of an internal combustion engine. From FIG. 1, the injector body is positioned from above the top of the cylinder head, through the fuel-sealing region (as noted at the rectangular O-ring groove 145) just above 140 and the tapered portion of the injector located approximately adjacent to 150 near the combustion sealing cone 160. Further, the combustion face is set forth as 199. Cylinder heads may experience damage in certain situations by cracking. When cracking of the head occurs, often a crack may be observed near the thinner material area where the injector tip conical machining approaches the combustion face 199. Cracks which may initiate may often grow radially outward towards the valve seat bore area 170 and occasionally into the injector bore area at approximately 180.

U.S. Pat. No. 6,474,285 sets forth an approach to first drill a hole at the damaged spark plug hole using a drill bit and stopper to provide a drilled hole. The approach then taps the drilled spark plug hole to create a threaded hole having a limited thread depth, where after a steel insert is threaded into the threaded hole with the stopper guiding the insert to a required depth. The approach then seats the insert to provide a spark plug seat. The approach is limited however in that it fails to provide either structural integrity to the damaged area and does not provide for a combination of crack repair and injector sleeve functionality. The approach is further limited as it fails to provide an insert solution having either radial or axial compliance. As a result of this repair, engine performance, and economics of the approach are less than desired.

U.S. Pat. No. 6,668,784 sets forth a replacement thread insert for the threads and tapered seat of a damaged tapered seat spark plug bore without the need to create a helical insert. The replacement insert is limited in its application as it fails to provide either structural integrity to the damaged area and does not provide for a combination of crack repair and injector sleeve functionality. As before, the approach is further limited to a spark plug.

U.S. Pat. No. 4,112,906, shows a firing deck insert for an internal combustion engine which includes a boss that is threaded into the cylinder head to support the insert. The configuration of the firing deck insert in Spencer requires a certain amount of precision machining for the firing deck insert. Moreover, there is no provision in this reference of some means for sealing around the valve openings in the insert. The approach is further limited as it fails to provide an insert solution having either radial or axial compliance. As a result of this repair, engine performance, and economics of the approach are less than desired.

Various conventional sleeve and cylinder head designs possess various complexities in the cylinder head to satisfy long term cylinder head durability requirements, and these complexities sometimes involve expensive details requiring tight tolerance and process controls.

What is needed is a method for repairing a multi-valve cylinder head, having an injector or spark plug opening near the valve openings, that provides an insert with structural integrity capable of providing both a repair for the crack and injector sleeve functionality for a cylinder head casting, allowing for a large injector tip/injector bore opening in the machined head. Preferably a resulting structure would enable an insert to enter into the valve seat bores, where the space could then be used to provide axial and radial compliance. The present invention, further described below, provides and satisfies such a desire.

SUMMARY

The embodiments consistent with the claimed inventions include a method for repairing a multi-valve cylinder head having an active opening near the valve openings. In one or more embodiments, the method includes placing a first bore pilot bushing above a top of the head and central to the injector or spark plug bore; drilling a first bore pilot hole at a first bore pilot diameter through the pilot bushing; drilling a second bore pilot hole from a bottom side of the head to a predetermined depth; cutting a conical surface around the outer diameter of the second bore pilot hole; completing a tapped hole; sealing one or more predetermined sealing locations before inserting an injector bore insert; re-boring one or more valve seats interior chamfers and cylindrical surfaces; facing off flush the insert with a combustion face; and, in some cases, scalloping the combustion face of the cylinder head, including the insert and valve seat bores, to reduce head and insert stresses In a further embodiment, the present invention provides for an injector bore insert for insertion in a cylinder head of an internal combustion engine, comprising: a proximate portion adjacent to a combustion face and a distal portion including an upper threaded outer diameter; an angled conical collar; a remote threaded portion on the outer diameter of an upper portion for improved axial compliance and bolted joint robustness; in some cases, a circumferential slot extending distally from approximately the combustion face for providing enhanced radial compliance; and one or more sealed regions for sealing following installation to prevent against one or more of fuel and coolant and combustion gasses.

In still a further embodiment, the present invention provides for an internal combustion engine having a multi-valve cylinder head with an active opening near the valve openings, comprising: an injector or spark plug or pre-chamber bore repaired by placing a first bore pilot bushing above a top of the head and central to the injector or spark plug or pre-chamber position; drilling a first bore pilot hole at a first bore pilot diameter through the pilot bushing; drilling a second bore pilot hole from a bottom side of the head to a predetermined depth; cutting a conical surface around the outer diameter of the second bore pilot hole; completing a tapped hole; sealing one or more predetermined sealing locations before inserting an injector bore insert; re-boring one or more valve seats' interior chamfers and cylindrical surfaces; facing off flush the insert with a combustion face; and, in some cases, scalloping the combustion face of the cylinder head, including the insert and valve seat bores, to reduce head and insert stresses.

DETAILED DESCRIPTION

The present invention, in one or more embodiments, provides for a method for repairing a multi-valve cylinder head, having an injector or spark plug or pre-chamber opening near the valve openings, that provides an insert with structural integrity that is capable of providing for both a repair for the crack and injector sleeve functionality for a cylinder head, allowing for a suitable injector tip/injector bore opening in the finish-machined head to enter into the valve seat bores with sufficient axial and radial compliance. It will be appreciated by those skilled in the art that the present invention overcomes the consequences and structural limitations typically confronting larger diameter configurations; for instance, the present invention provides for sealing while going external or outside into the valve-seating area, distinctively. More particularly, the present invention provides a unique approach for enabling reliable sealing while affecting the valve-seat receiving area.

Figure 1:
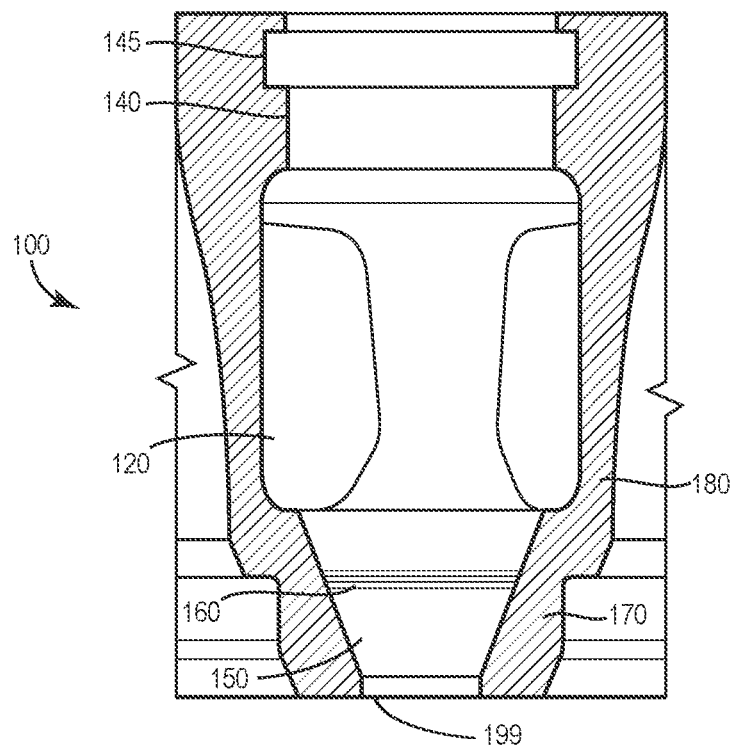
FIG. 1 sets forth a cylinder head showing a cross section of an injector bore above two valve seat receiving details in a cylinder head of an internal combustion engine.
Figure 2:
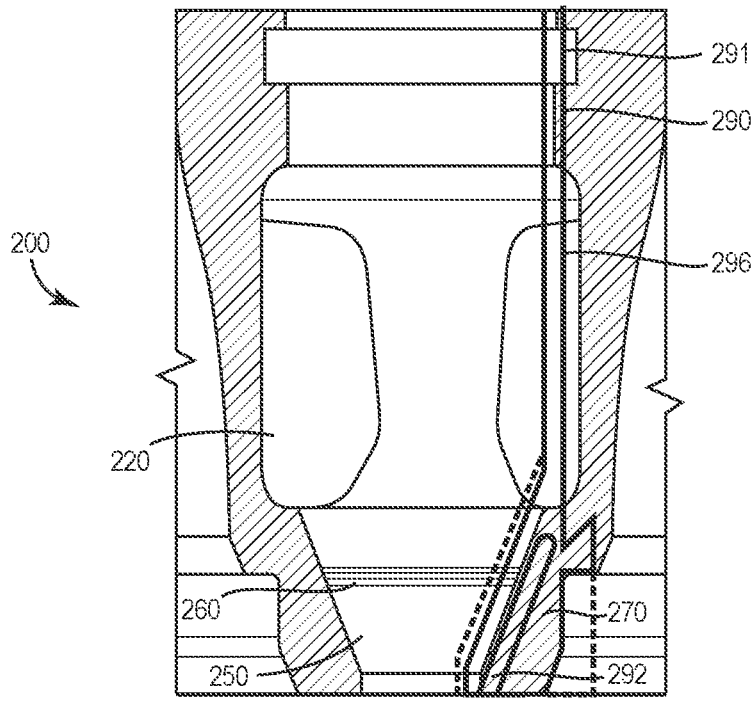
FIG. 2 sets forth a cylinder head showing a cross section of an injector bore above two valve seat receiving details in a cylinder head of an internal combustion engine including a profile of an injector bore repair insert of the present invention in accordance with one embodiment.

FIG. 2 sets forth a cylinder head 200 showing a cross section of an injector bore 220 above two valve seat receiving details in a cylinder head of an internal combustion engine including a profile 290 of an injector insert of the present invention in accordance with one embodiment. From FIG. 2, the top of the injector is positioned above the portion of the cylinder head depicted and the tapered tip portion of the injector is located at approximately 250 near the combustion seal 260. The injector insert 290, also understood as an injector sleeve, includes a narrow portion preferably having a distal threaded portion 291 and a proximate wider slotted portion 270. Preferably, the narrow portion, also referred to as the upper bore 296 is a thin and flexible insert body so as provide axial compliance which is stretched via assembly preload; the upper bore provides for an improved ability to follow the vertical distortion of the combustion face in response to thermal and pressure loading. Preferably, the injector sleeve, in one or more embodiments, includes a full circumference slot 292 to improve radial flexibility at the collar and between the injector bore and the valve seat insert bores; by including a slot in the present invention, there is an improved ability to follow the radial distortions of the combustion face.

Figure 3:
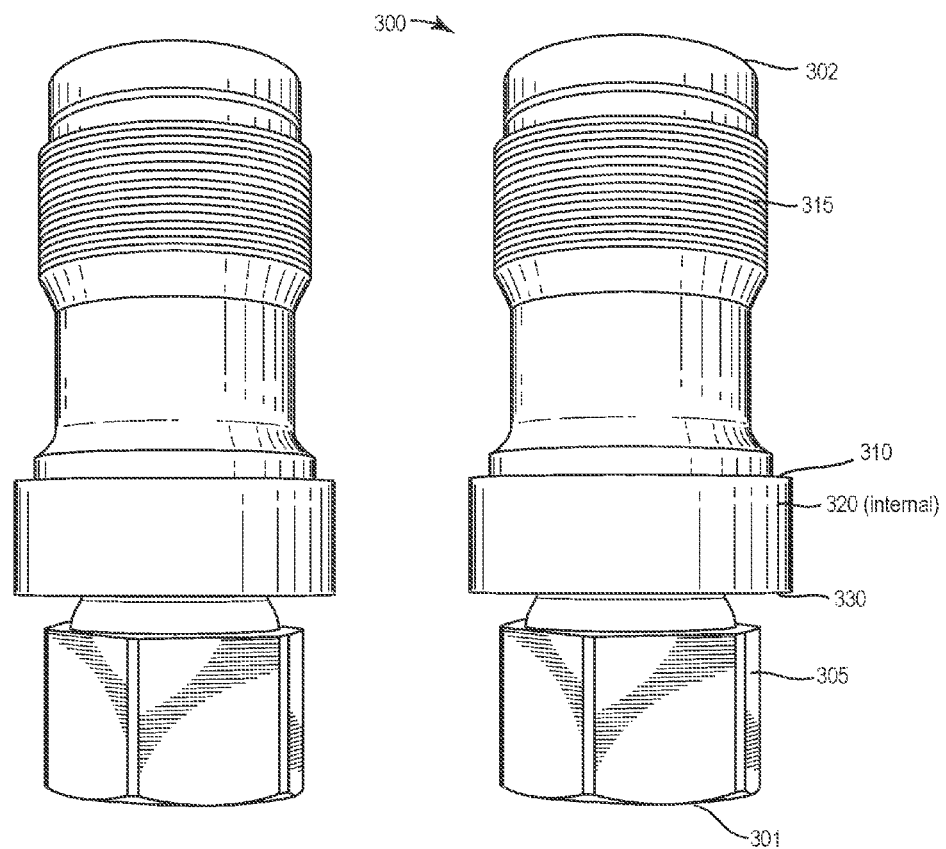
FIG. 3 sets forth a group of injector bore repair sleeves of the present invention in accordance with one embodiment.

FIG. 3 sets forth a group of injector sleeves 300 of the present invention in accordance with one embodiment. From FIG. 3, the sleeves are depicted with the proximate portion at 301 and the distal portion at 302. The sleeves also preferably include a driveable hex portion at 305, which is preferably of a break-off construction; an angled conical collar is at 310 and the reverse-angle conical collar initiates at approximately 320 (interior to the part) and extends out towards the edge at 310; a remote anchorage thread location at 315, preferably at the far side of the water jacket; and a circumferential slot within the collar 320 extending from approximately the combustion face 330 towards the distal portion, for providing enhanced radial compliance.

Figure 4:
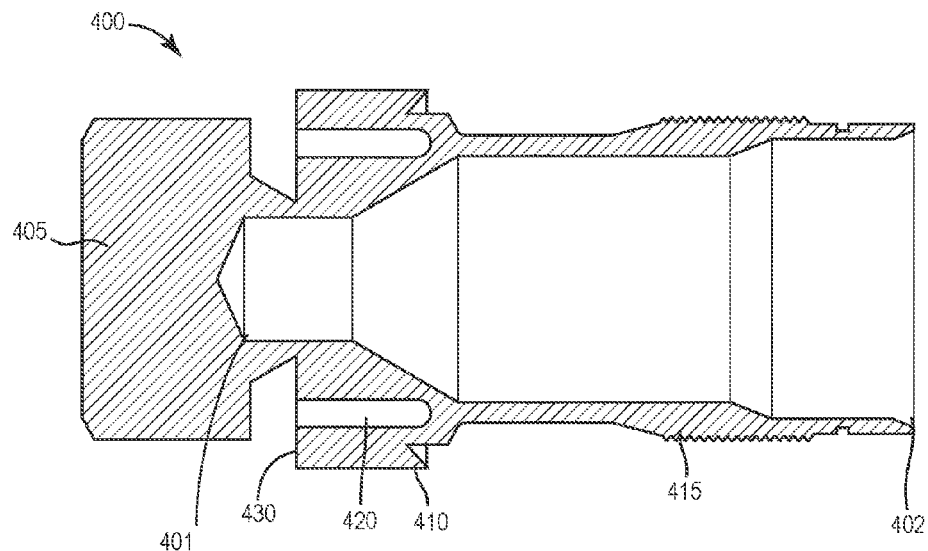
FIG. 4 sets forth a schematic view of a cross-section of an injector bore repair sleeve 400, also used herein as an injector bore insert, of the present invention in accordance with one embodiment.

FIG. 4 sets forth a schematic view of a cross-section of an injector sleeve 400, also used herein as an injector bore insert, of the present invention in accordance with one embodiment. From FIG. 4, the sleeve has a proximate portion at 401 and a distal portion at 402. The sleeve is also preferably inclusive of a hex portion at 405, which is preferably of a removable construction given a predetermined torque value; an angled conical collar at 410, which may preferably be angled obtusely or acutely; a remote threaded location at 415, preferably for improved axial compliance and bolted joint robustness; and a circumferential slot 420 extending from approximately the combustion face 430 towards the distal portion, for providing enhanced radial compliance. The injector insert of the present invention further includes a sealed region around the threaded area once inserted, to prevent against fuel from above (distally) and coolant from below (proximately). Other sealing locations are also understood to be necessary for the proper operation of the insert.

Operatively, the injector bore insert of the present invention replaces the injector sleeve of an original construction and goes through the lower water jacket of the cylinder head. Therefore, the injector bore insert includes the functionality of an injector sleeve as the insert, where the insert inner dimension at the distal portion closely approximates the original injector sleeve and cylinder head bore, from a perspective of the injector side. Similarly, the injector bore insert of the present invention provides additional radial space for the structure of the insert without obstructing the water jacket around the injector sleeve. Further the proximate inner dimension region of the bore insert closely approximates the installed/machined dimensions of the original injector sleeve.

For installation, the injector bore insert of the present invention is preferably installed with significant preload in order to favorably pre-stress the combustion face region. Additionally, the insert conical collar 410 is preferably positioned at a depth such that it has continuous, full-circumference contact with the cylinder head material creating a primary lower sealing location on the conical surface of the collar. Additionally, the bore insert may be comprised of materials suited for the high thermal and pressure loads associated with internal combustion operation and may include, but not be limited to materials such as and including 4140 steel material pre-hardened to approximately HRC 30, or similar, for example. Further the sealing sleeve is preferably sized, dimensioned, and formed of an appropriate material, to be appropriately fitted into place in the injector mounting bore formed in the cylinder head.

Figure 5:
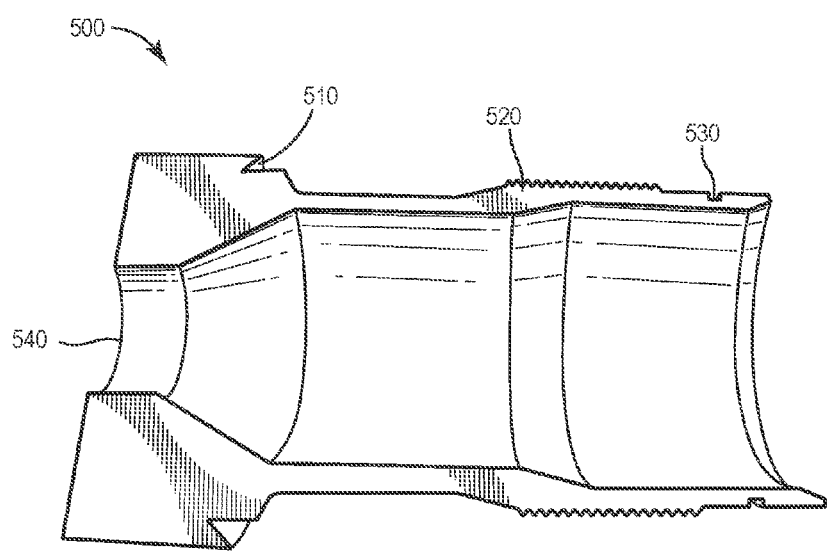
FIG. 5 sets forth a sectioned insert profile indicating locations for sealing in accordance with one or more embodiments of the present invention.

FIG. 5 sets forth a sectioned insert profile 500 indicating locations for sealing in accordance with one or more embodiments of the present invention. At 510, a non-setting gasket sealant is preferably used to ensure adequate sealing. For example, a Hylomar™ sealant is preferably used. At 520, LNS sealant, or similar, is placed along the threaded portion in the upper bore. At 530, an O-ring is preferably placed into the groove. At 540, a faceoff cutting tool or similar has been employed to remove the hex drive lug break away, in one embodiment, though it will be appreciated that other variations may be implemented.

Figure 6:
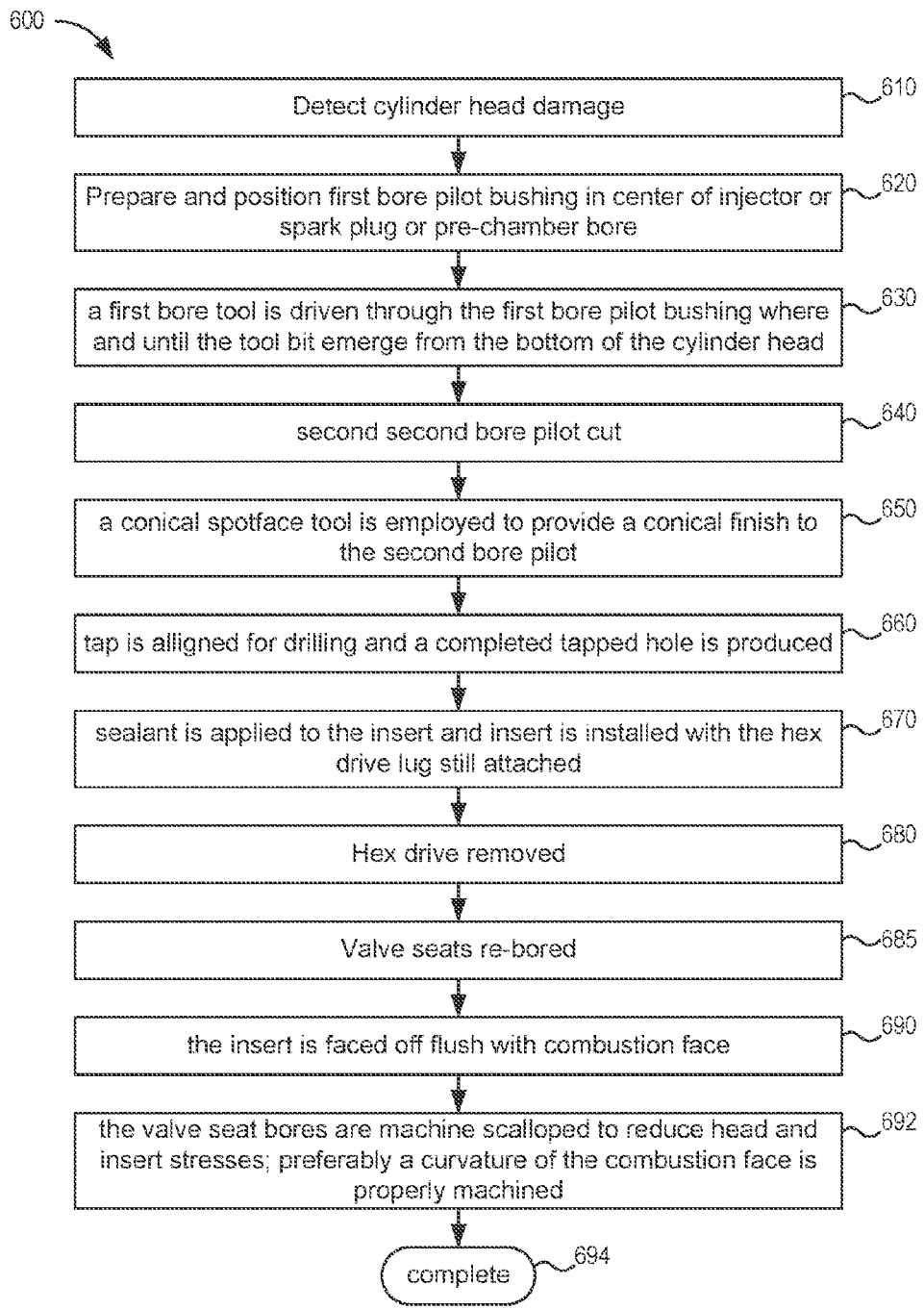
FIG. 6 sets forth a stepwise method for repairing a cracked cylinder in accordance with the present invention.

FIG. 6 sets forth a stepwise method for repairing a cracked cylinder in accordance with the present invention. At 610, a cylinder head is identified as damaged related to cracking. At 620, a first bore pilot bushing is placed above the top of the head; preferably the pilot bushing is placed central to the injector bore. At 630, a first bore tool is driven through the first bore pilot bushing where and until the tool bit emerges from the bottom of the cylinder head. At 640, a second bore pilot hole is cut from the bottom of the cylinder head to a predetermined depth. In general, the second pilot bore will be a larger diameter than the first pilot. At 650, a conical spotface tool is employed to provide a conical surface around the outer diameter of the second bore pilot. At 660, a tap is aligned for tapping and a completed tapped hole is produced. At 670, sealants and an O-ring are applied to the insert and the insert is installed with the hex drive lug still attached; preferably Hylomar™, or equivalent, is applied to the conical region and LNS is applied to the threaded region, for instance, and preferably an O-ring is installed onto the insert before installation. At 680, the hex drive lug is removed. At 685, the valve seat insert bores are machined, including the valve seat bores interior chamfers and cylindrical surfaces. At 690, the insert is faced off flush with combustion face. At 692, the area around the insert, including the insert, the valve seat bores and the combustion face, is machined in a scalloped geometry to reduce head and insert stresses; preferably a concave curvature of the combustion face is machined. Additionally, preferably a stretch measurement tool is utilized during the installation process to assess installed stretch (and preload) of the insert. As a result, the head is now returned to standard dimensions and structure and the equivalent of the injector sleeve is in place. At 694, the method of the present invention, in accordance with one embodiment is complete.

Figure 7:
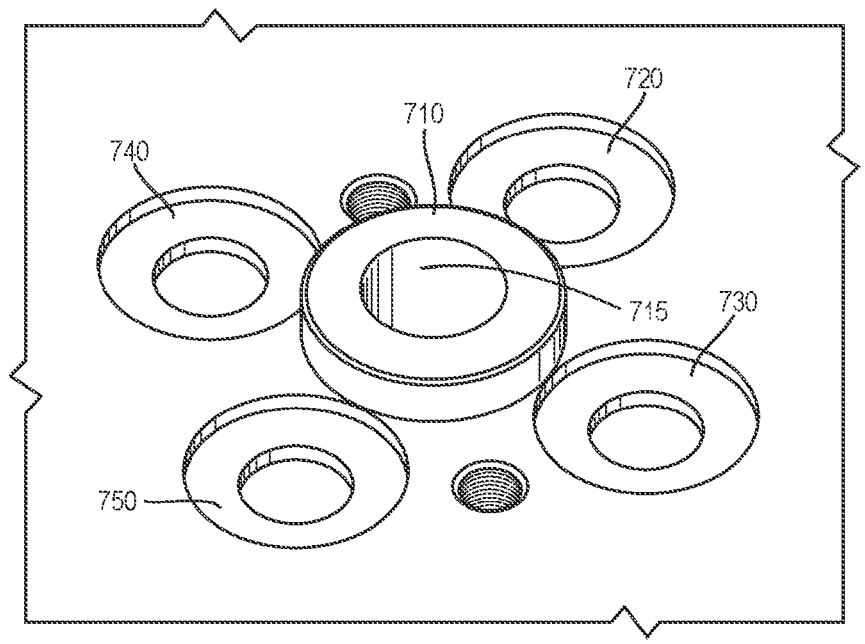
FIG. 7 sets forth a depiction of the placement of a first bore pilot bushing placed above the top of the head, where the pilot bushing is placed central to the injector bore, which in this example is somewhat central to the multi-valve positions.

FIG. 7 sets forth a depiction of the placement of a first bore pilot bushing 710 placed above the top of the head at 715, where the pilot bushing is placed centrally in the injector bore, which is approximately central to the multi-valve positions 720, 730, 740 and 750.

Figure 8:
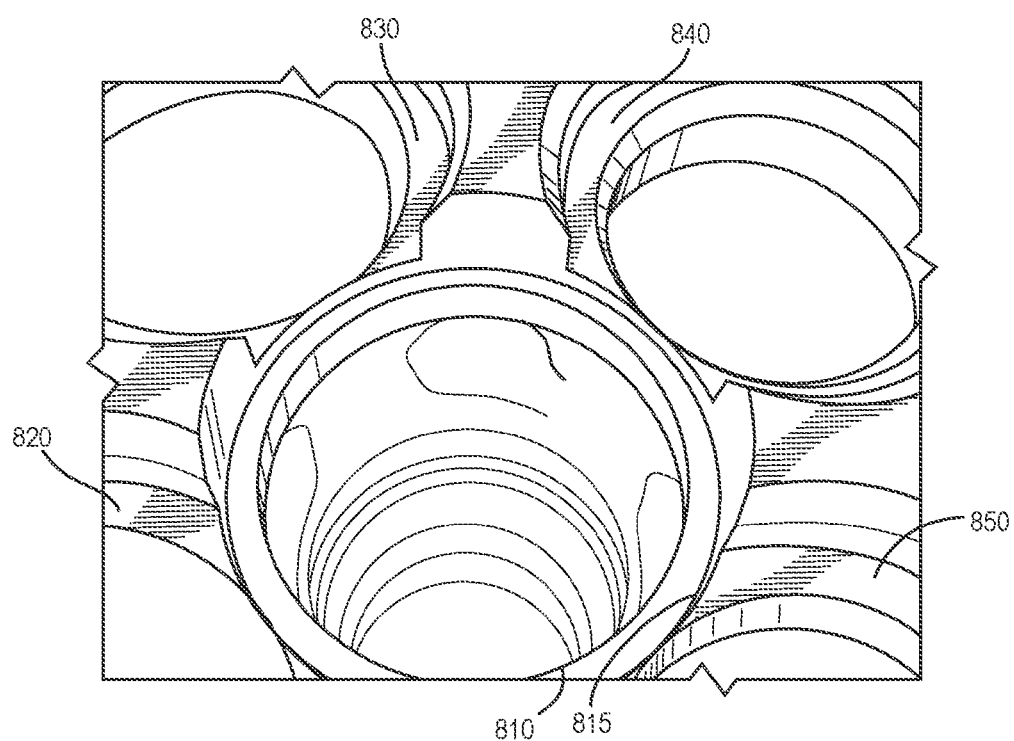
FIG. 8 sets forth a depiction of the conical spotface resulting from using a conical spotface tool following the second bore pilot.

FIG. 8 sets forth a depiction of the conical spotface resulting from using a conical spotface tool following the second bore pilot. At 810 is the inner edge of the conical spotface and 815 is the outer edge of the conical spotface, and at 820, 830, 840 and 850 are each of the valve seat-receiving details.

Figure 9:
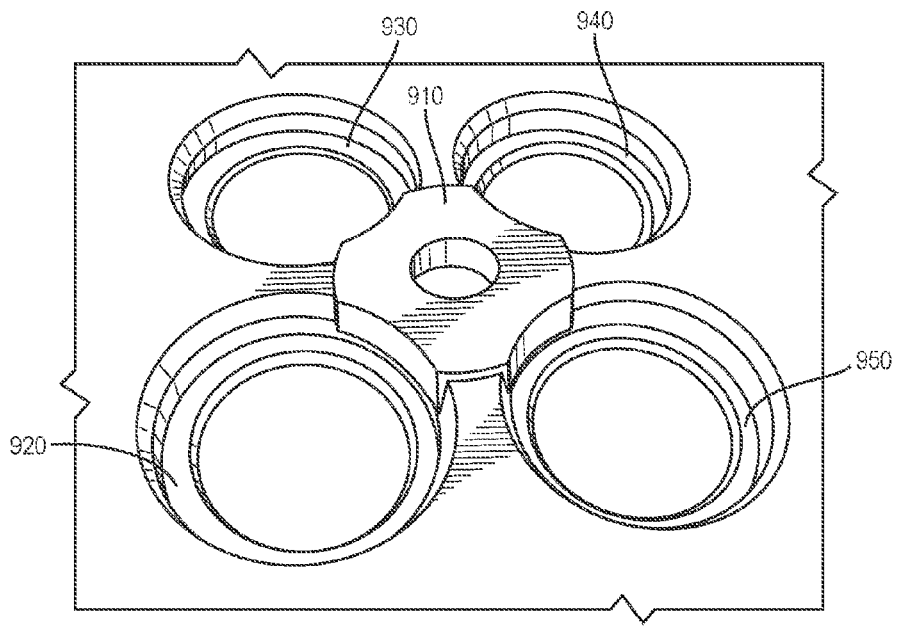
FIG. 9 depicts completed valve seat-receiving cylindrical bore diameters following the re-boring of the valve seats' receiving bores; prior to re-machining of the valve seat receiving chamfers and, FIG. 10 sets forth the valve seat receiving bores, with the chamfer re-machining completed and with the valve seats installed and insert bore after scallop machining, including curvature of the combustion face.

FIG. 9 depicts completed valve seat bore cylindrical diameters following the re-boring of the valve seats. At 910 is the remaining insert bore and at 920, 930, 940 and 950 are the valve seat-receiving details.

Figure 10:
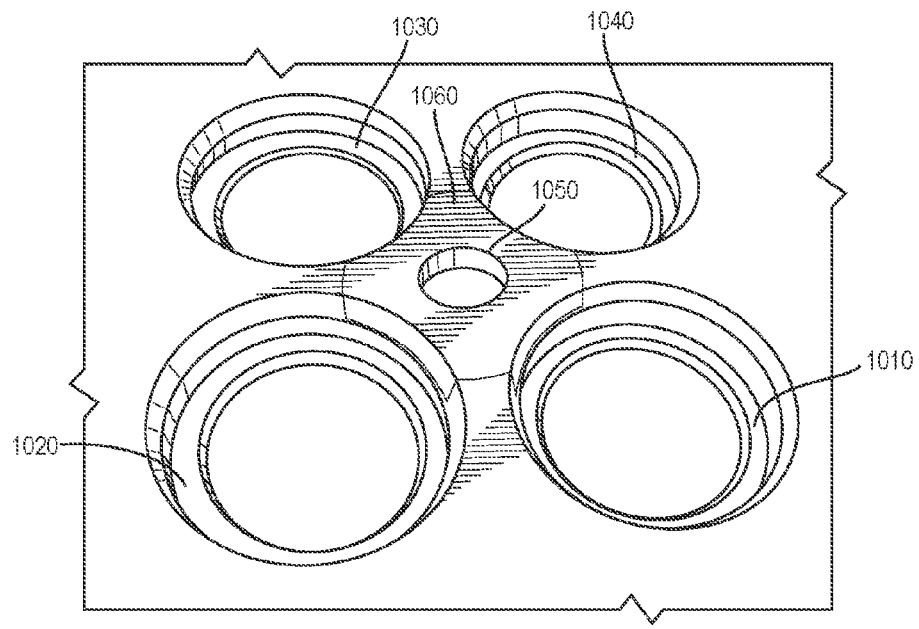

FIG. 10 sets forth the valve seat bores 1010, 1020, 1030, 1040 with valve seat inserts installed and with valve seat receiving chamfers completed and insert bore 1050 after scallop machining, including curvature of the combustion face 1060.

It will be appreciated by those skilled in the art that the present invention is suitable for application to a broader range of openings that may be in the combustion face of the head, closely located to one or more valves: Fuel Injector, Air Injector, EGR Injector, Glow Plug, Spark Plug, Pre-Chamber, Cylinder Pressure-sensing Port, etc. Furthermore, it will be appreciated by those skilled in the art that the present invention is suitable for application to a broad range of cylinder heads. For example the repaired cylinder head could be made from one or more of compacted graphite iron and alloyed gray iron or ductile iron or other ferrous materials. Finally, the repaired cylinder head could be made from aluminum utilizing a suitable Insert design and providing appropriate material selection.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. An injector bore insert, comprising:
   a proximate portion adjacent to a combustion face and a distal portion including an upper threaded outer diameter;
   an angled conical collar;
   a remote threaded portion along an upper bore portion;
   a circumferential slot extending distally from approximately the combustion face; and
   one or more sealing regions, each sealing region being positioned on the injector bore insert to facilitate sealing between the injector bore insert and a cylinder head of an internal combustion engine.

2. The injector bore insert of claim 1, further comprising a removable hex portion positioned at the proximate portion.

3. The injector bore insert of claim 2, wherein the removable hex portion has a removable construction given a predetermined torque value.

4. The injector bore insert of claim 1, wherein the angled conical collar is angled obtusely or acutely.

5. The injector bore insert of claim 1, wherein the injector bore insert comprises a steel material.

6. The injector bore insert of claim 1, wherein an inner dimension of the distal portion is approximately equal to an inner dimension of an original injector sleeve of the cylinder head.

7. The injector bore insert of claim 1, wherein an inner dimension of the proximate portion is approximately equal to an inner dimension of an original injector sleeve of the cylinder head.

8. The injector bore insert of claim 1, wherein the remote threaded portion is flexible.

9. The injector bore insert of claim 1, wherein the injector bore insert comprises materials suitable for high thermal and pressure loads associated with internal combustion operation.

10. The injector bore insert of claim 1, wherein the slot is fully circumferential.

11. The injector bore insert of claim 1, wherein the one or more sealing regions comprises a circumferential groove at the distal end.

12. The injector bore insert of claim 11, wherein the circumferential grove is configured to receive a seal.

13. An injector bore insert, comprising:
a proximate portion adjacent to a combustion face, the proximate portion defining a slot extending distally from the combustion face and circumferentially around a valve seat bore portion of the proximate portion; and
a distal portion, an exterior of the distal portion comprising a threaded portion and defining a groove configured to engage a seal.

14. The injector bore insert of claim 13, wherein the slot is configured to provide radial flexibility of the proximate portion.

15. The injector bore insert of claim 13, further comprising a hex drive lug having a predetermined break away torque.

16. The injector bore insert of claim 13, wherein the proximate portion comprises a conical collar.

17. The injector bore insert of claim 13, wherein dimensions of an interior of the injector bore insert closely approximate dimensions of an injector sleeve and a cylinder head bore.

18. The injector bore insert of claim 13, wherein the injector bore insert comprises pre-hardened steel.

19. The injector bore insert of claim 13, wherein internal dimensions of the injector bore insert are configured to fittingly receive a fuel injector, an air injector or an exhaust gas recirculation injector.

20. The injector bore insert of claim 13, wherein internal dimensions of the injector bore insert are configured to fittingly receive a spark plug or a glow plug.

* * * * *